United States Patent [19]

Clark

[11] 4,027,266
[45] May 31, 1977

[54] DIGITAL FSK DEMODULATOR

[75] Inventor: James Monroe Clark, Cedar Grove, N.J.

[73] Assignee: International Telephone and Telegraph Corporation, Nutley, N.J.

[22] Filed: June 10, 1976

[21] Appl. No.: 694,733

[52] U.S. Cl. .............. 329/105; 325/320; 329/107; 329/122; 329/126

[51] Int. Cl.[2] ............ H03D 3/00; H03K 9/06; H04L 27/14

[58] Field of Search ........... 329/50, 104, 105, 107, 329/122, 126; 325/320, 30; 178/66 R, 88

[56] References Cited

UNITED STATES PATENTS

| 3,600,680 | 8/1971 | Maniere et al. | 329/126 X |
|---|---|---|---|
| 3,979,685 | 9/1976 | Motley et al. | 329/105 |

*Primary Examiner*—Siegfried H. Grimm
*Attorney, Agent, or Firm*—John T. O'Halloran; Alfred C. Hill

[57] ABSTRACT

The demodulator produces an inphase digital reference signal having the form cos A by means of an analog-to- digital converter and a quadrature digital reference signal having the form sin A by means of an N-stage shift register coupled to the converter. An inphase digital FSK signal having the form cos B is provided by a second analog-to-digital converter and a quadrature digital FSK signal having the form sin B is produced by a second N-stage shift register. A first read only memory responsive to the inphase and quadrature digital reference signals and the inphase and quadrature FSK signals produce an inphase code signal and a quadrature code signal for estimating the value of (B − A). A first M-stage shift register delays the inphase code signal and a second M-stage shift register delays the quadrature code signal. A second read only memory responsive to the inphase and quadrature code signals and the delayed inphase and quadrature code signals determine whether the value of (B − A) is increasing or decreasing. Logic gate means coupled to the two outputs of the second read only memory determines whether a first given code is detected more frequently than a second code and vice versa. A low pass filter coupled to the logic gate means averages the difference between the first and second given codes to produce a high voltage for a "mark" and a low voltage for a "space."

49 Claims, 2 Drawing Figures

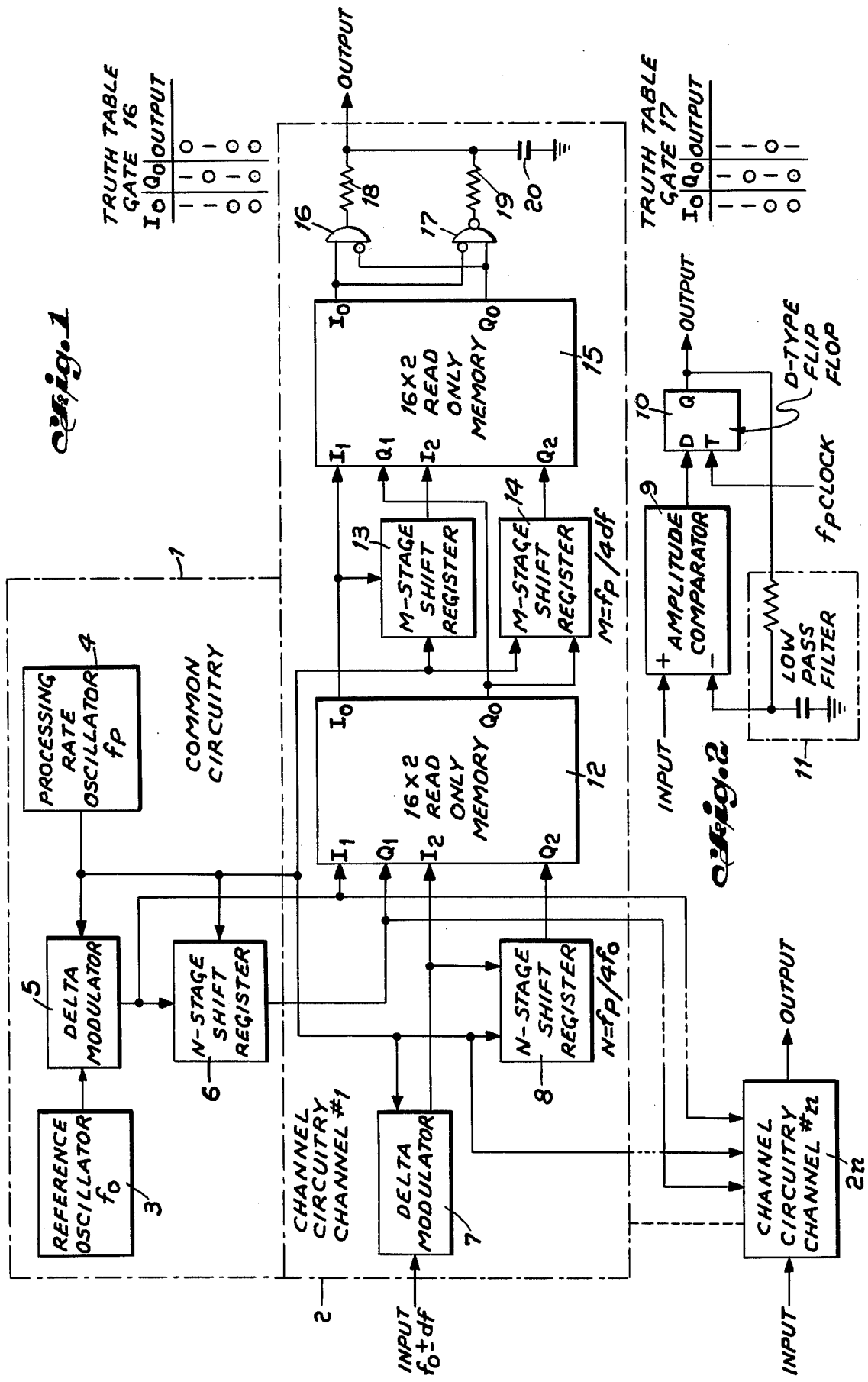

DIGITAL FSK DEMODULATOR

BACKGROUND OF THE INVENTION

This invention relates to data demodulators and more particularly to FSK (frequency shift keyed) data demodulators.

FSK demodulators have in the past primarily employed analog processing which utilized a first analog circuit to detect the "mark" frequency and a second analog circuit to detect the "space" frequency to demodulate FSK signals.

SUMMARY OF THE INVENTION

An object of the present invention is to provide an FSK demodulator which employs digital processing techniques.

A feature of the present invention is the provision of a digital frequency shift keyed (FSK) demodulator comprising: a first source of an analog reference signal; a second source of analog FSK signals; first digital means coupled to the first source to produce an inphase digital representation of the reference signal having the form cos A, where A is an angle, and a quadrature digital representation of the reference signals having the form sin A; second digital means coupled to the second source to produce an inphase digital representation of the FSK signals having the form cos B, were B is an angle, and a quadrature digital representation of the FSK signals having the form sin B; third digital coupled to the first and second digital means to produce an inphase code signal and a quadrature code signal for estimating the value of (B − A); fourth digital means coupled to the third digital means responsive to the inphase and quadrature code signals to determine whether the value of (B − A) is increasing or decreasing, the fourth digital means having an inphase output and a quadrature output; fifth digital means coupled to the inphase and quadrature outputs to determine whether a first given code is detected more frequently than a second given code and vice versa; and averaging means coupled to the fifth digital means to average the difference between the first and second given codes to produce a high voltage for a mark and a low voltage for a space.

BRIEF DESCRIPTION OF THE DRAWING

Above-mentioned and other features and objects of this invention will become more apparent by reference to the following description taken in conjunction with the accompanying drawing, in which:

FIG. 1 is a block diagram of the digital FSK demodulator in accordance with the principles of the present invention; and FIG. 2 is a block diagram of a delta modulator that may be employed for the delta modulators of FIG. 1.

DESCRIPTION OF THE PREFERRED EMBODIMENT

Referring to FIG. 1 there is illustrated therein common circuity 1 which is common to a plurality of channel circuitry 2–2n. The channel circuitry 2 illustrates the block diagram of the digital FSK demodulator of the present invention.

Common circuitry 1 includes a reference oscillator 3 generating a sinusoidal signal having a center frequency $f_o$ and a processing rate oscillator 4 to generate a clock having a frequency $f_p$. The output of oscillator 3 is converted to digital form in delta modulator 5 to provide a digital inphase reference signal $I_1$. The operation of modulator 5 is controlled by the clock signal of oscillator 4. The output of modulator 5 is delayed in an N-stage shift register 6 to provide a quadrature digital reference signal $Q_1$. The operation of register 6 is also controlled by the clock of oscillator 4. The FSK input to channel circuitry 2 is a sinusoidal signal having a frequency $f_o - df$ to represent a mark or logical 1 and a frequency $f_o + df$ to represent a space or a logical 0. The input signal is converted to digital form in delta modulator 7 under control of the clock of oscillator 4. The output of modulator 7 is an inphase digital FSK signal $I_2$ which is coupled to an N-stage shift register 8 to provide a quadrature digital FSK signal $Q_2$. Register 8 is also under control of the clock of oscillator 4.

The circuitry of modulators 5 and 7 is illustrated in FIG. 2 to include an amplitude comparator 9 whose output is coupled to the D input of a D-type flip flop 10 under control of the clock of oscillator 4. The digital output is removed from the Q output of flip flop 10 and is also coupled through a low pass filter 11 to the minus input of comparator 9 which has its plus input coupled to the input signal, either the output of oscillator 3 or the FSK input.

The delta modulator employed herein has the property that the short-term average or low-frequency component of the output is equal to the input. That is, if the input is sin A, where the angle A is a linear function of time, than the probability that the output is a logical 1 will be $(1 + \sin A)/2$, and the probability that the output will be a logical 0 is $[1 - (1 + \sin A)]/2 = (1 - \sin A)/2$. This point of view allows the response of logic circuit to be predicted by statistical analysis.

The digital FSK signal and the digital reference signal are each delayed by their associated N-stage shift registers 8 and 6, respectively. The number of stages N of the shift registers 6 and 8 is chosen to be $f_p/(4f_o)$ to make the delay equal to a 90° phase shift. As pointed out hereinabove, the signal before delay is called "inphase" and is identified by I and the signal after delay is called "quadrature" and is identified by Q. Thus, if the digital reference signal I is cos A, the digital reference signal Q is sin A, where $A = 2\pi f_o t$, where $t$ is equal to time. Likewise, the I and Q digital FSK signals are cos B and sin B, respectively, where B equals $(1 \pm m)A$, where $m$ is equal to the modulation index $df/f_o$.

A pair of bits (I and Q) at any given time may be interpreted as an estimate of the angle A or B of the signal, coded as shown in TABLE I.

TABLE I

| IQ | Angle |
|---|---|
| 11 | 0° |
| 01 | 90° |
| 00 | 180° |
| 10 | 270° |

If $I_1$, $Q_1$ is an estimate of the angle A and $I_2$ ($Q_2$) is an estimate of the angle B, then a 16 × 2 read only memory 12 connected to modulators 5 and 7 and registers 6 and 8 as illustrated and coded as shown in TABLE II can be used to form a code $I_0 Q_0$ estimating the difference of the angles B and A, namely, (B−A). The difference angle (B−A) will be increasing if the input FSK frequency is $f_o + df$ (space) and decreasing if the input FSK frequency is $f_o - df$ (mark).

TABLE II

| Code | | | | | | Interpretation in Degrees | | |
|---|---|---|---|---|---|---|---|---|
| $I_1$ | $Q_1$ | $I_2$ | $Q_2$ | $I_0$ | $Q_0$ | A | B | B-A |
| 1 | 1 | 1 | 1 | 1 | 1 | 0 | 0 | 0 |
| 1 | 1 | 0 | 1 | 0 | 1 | 0 | 90 | 90 |
| 1 | 1 | 0 | 0 | 0 | 0 | 0 | 180 | 180 |
| 1 | 1 | 1 | 0 | 1 | 0 | 0 | 270 | 270 |
| 0 | 1 | 1 | 1 | 1 | 0 | 90 | 0 | 270 |
| 0 | 1 | 0 | 1 | 1 | 1 | 90 | 90 | 0 |
| 0 | 1 | 0 | 0 | 0 | 1 | 90 | 180 | 90 |
| 0 | 1 | 1 | 0 | 0 | 0 | 90 | 270 | 180 |
| 0 | 0 | 1 | 1 | 0 | 0 | 180 | 0 | 180 |
| 0 | 0 | 0 | 1 | 1 | 0 | 180 | 90 | 270 |
| 0 | 0 | 0 | 0 | 1 | 1 | 180 | 180 | 0 |
| 0 | 0 | 1 | 0 | 0 | 1 | 180 | 270 | 90 |
| 1 | 0 | 1 | 1 | 0 | 1 | 270 | 0 | 90 |
| 1 | 0 | 0 | 1 | 0 | 0 | 270 | 90 | 180 |
| 1 | 0 | 0 | 0 | 1 | 0 | 270 | 180 | 270 |
| 1 | 0 | 1 | 0 | 1 | 1 | 270 | 270 | 0 |

To detect whether (B−A) is increasing or decreasing, that is, whether the frequency difference (B−A)/t is positive or negative, the signals $I_0 Q_0$ are each delayed by an M-stage shift register, such as registers 13 and 14, respectively, whose operation is controlled by the clock from oscillator 4. The difference angle after delay (B−A) is subtracted from the difference angle before delay (B'−A') using a second 16 × 2 ROM 15 coded like ROM 12 as shown in TABLE II. Logic gate means in the form of gates 16 and 17 detect whether ROM 15 produces a +90° code (0 1), more frequently than a −90° or 270° code (1 0). If this occurs, then a space is detected. However, if gates 16 and 17 detect the code (1 0) more frequently then the (0 1) code then a mark is detected. A low pass filter including resistors 18 and 19 and capacitor 20 averages the difference between these two codes, producing a high voltage for mark and a low voltage for space.

The statistical analysis of the circuit operation is briefly as follows. The probabilities of a logical 1 for the reference I and Q signals are:

$$P_{IA} = \frac{1 + \cos A}{2}, \quad P_{QA} = \frac{1 + \sin A}{2} \quad (1)$$

and the probabilities of a logical 0 are:

$$1 - P_{IA} = \frac{1 - \cos A}{2}, \quad 1 - P_{QA} = \frac{1 - \sin A}{2} \quad (2)$$

The same equations, but using B instead of A apply to the input FSK I and Q signals. The probabilities for the two-bit angle codes for A and B are products of the above probabilities for the single bits, thus:

$$P_{11A} = \frac{(1 + \cos A)(1 + \sin A)}{4}, \quad P_{01A} = \frac{(1 - \cos A)(1 + \sin A)}{4}$$

$$P_{00A} = \frac{(1 - \cos A)(1 - \sin A)}{4}, \quad P_{10A} = \frac{(1 + \cos A)(1 - \sin A)}{4}$$

$$P_{11B} = \frac{(1 + \cos B)(1 + \sin B)}{4}, \quad P_{01B} = \frac{(1 - \cos B)(1 + \sin B)}{4}$$

$$P_{00B} = \frac{(1 - \cos B)(1 - \sin B)}{4}, \quad P_{10B} = \frac{(1 + \cos B)(1 - \sin B)}{4} \quad (3)$$

The probabilities for the two bit-codes out of the first ROM 12, representing the difference angle (B−A), follow directly from the ROM code TABLE II.

$$P_{11(B-A)} = P_{11A} P_{11B} + P_{01A} P_{01B} + P_{00A} P_{00B} + P_{10A} P_{10B}$$

$$P_{01(B-A)} = P_{11A} P_{01B} + P_{01A} P_{00B} + P_{00A} P_{10B} + P_{10A} P_{11A}$$

$$P_{00(B-A)} = P_{11A} P_{00B} + P_{01A} P_{10B} + P_{00A} P_{11B} + P_{10A} P_{01B}$$

$$P_{10(B-A)} = P_{11A} P_{10B} + P_{01A} P_{11B} + P_{00A} P_{01B} + P_{10A} P_{00B} \quad (4)$$

These probabilities have been computed from the above probability equations (3) to be:

$$P_{11(B-A)} = \frac{1 + \cos(B-A)}{4} + f, \quad P_{01(B-A)} = \frac{1 + \sin(B-A)}{4} - f,$$

$$P_{00(B-A)} = \frac{1 - \cos(B-A)}{4} + f, \quad P_{10(B-A)} = \frac{1 - \sin(B-A)}{4} - f,$$

where $f = \frac{\sin 2A \sin 2B}{16} = \frac{\cos 2(B-A) - \cos 2(B+A)}{32}$. (5)

The same equations apply for both (B−A) and (B'−A'). Again, from the ROM code TABLE II, the probabilities $P_+$ for the (01) code, and $P_-$ for the (10) code out of the second ROM 15, can be written:

$$P_+ = P_{11(B-A)} P_{01(B'-A')} + P_{01(B-A)} P_{00(B'-A')} + P_{00(B-A)} P_{10(B'-A')} + P_{10(B-A)} P_{11(B'-A')} \quad (6)$$

$$P_- = P_{11(B-A)} P_{10(B'-A')} + P_{01(B-A)} P_{11(B'-A')} + P_{00(B-A)} P_{01(B'-A')} + P_{10(B-A)} P_{00(B'-A')} \quad (7)$$

These probabilities were computed from the equations (5) to be:

$$P_+ = \frac{1}{4} + \frac{\sin[(B'-A') - (B-A)]}{8} - \frac{\sin 2A \sin 2B \sin 2A' \sin 2B'}{64} \quad (8)$$

$$P_- = \frac{1}{4} - \frac{\sin[(B'-A') - (B-A)]}{8} - \frac{\sin 2A \sin 2B \sin 2A' \sin 2B'}{64} \quad (9)$$

The difference between these two probabilities is:

$$P_+ - P_- = \tfrac{1}{4} \sin[(B'-A') - (B-A)]$$

If we average the probability $P_+$ for having a (01) code and the probability $(1 - P_-)$ for not having a (10) code, a similar result is obtained:

$$P_{OUT} = \frac{(P_+) + (1 - P_-)}{2} = \frac{1}{2} + \frac{1}{8} \sin[(B'-A') - (B-A)]$$

If m is the modulation index $df/f_0$, and d is the delay of the M-bit shift registers expressed in radians of the phase relative to the reference A, the output result may be restated as:

$$P_{OUT} = \frac{1}{2} \pm \frac{1}{2} \sin m\, d$$

(+for space, −for mark). The block diagram of the FIG. 1 shows the logic polarities reversed to obtain logic high for mark.

By selecting $M - f_s/(4\, df)$, $\sin m\, d = 1$, thus maximizing the output amplitude. The output low pass filter converts the output probability to a signal amplitude.

While I have described above the principles of my invention in connection with specific apparatus it is to be clearly understood that this description is made only by way of example and not as a limitation to the scope of my invention as set forth in the objects thereof and in the accompanying claims.

I claim:

1. A digital frequency shift keyed (FSK) demodulator comprising:
   a first source of an analog reference signal;
   a second source of analog FSK signals;
   first digital means coupled to said first source to produce an inphase digital representation of said reference signal having the form cos A, where A is an angle, and a quadrature digital representation of said reference signal having the form sin A;
   second digital means coupled to said second source to produce an inphase digital representation of said FSK signals having the form cos B, where B is an angle, and a quadrature digital representation of said FSK signals having the form sin B;
   third digital means coupled to said first and second digital means to produce an inphase code signal and a quadrature code signal for estimating the value of (B−A);
   fourth digital means coupled to said third digital means responsive to said inphase and quadrature code signals to determine whether the value of (B−A) is increasing or decreasing, said fourth digital means having an inphase output and a quadrature output;
   fifth digital means coupled to said inphase and quadrature outputs to determine whether a first given code is detected more frequently than a second given code and vice versa; and
   averaging means coupled to said fifth digital means to average the difference between said first and second given codes to produce a high voltage for a mark and a low voltage for a space.

2. A demodulator according to claim 1, wherein said first digital means includes
   an analog-to-digital converter coupled to said first source to produce said inphase digital reference signal, and
   a digital delay means coupled to said converter to produce said quadrature digital reference signal.

3. A demodulator according to claim 2, wherein said converter is a delta modulator.

4. A demodulator according to claim 3, wherein said delta modulator includes
   an amplitude comparator having an output, a minus input and a plus input coupled to said first source,
   a D-type flip flop coupled to said output of said comparator to provide said inphase digital reference signal, and
   a low pass filter coupled between 1 output of said flip-flop and said minus input of said comparator.

5. A demodulator according to claim 3, wherein said delay means is an N-stage shift register, where N is an integer greater than one.

6. A demodulator according to claim 2, wherein said delay means is an N-stage shift register, where N is an integer greater than one.

7. A demodulator according to claim 1, wherein said second digital means includes
   an analog-to-digital converter coupled to said second source to produce said inphase digital FSK signals, and
   a digital delay means coupled to said converter to produce said quadrature digital FSK signals.

8. A demodulator according to claim 7, wherein said converter is a delta modulator.

9. A demodulator according to claim 8, wherein said delta modulator includes
   an amplitude comparator having an output, a minus input and a plus input coupled to said second source;
   a D-type flip flop coupled to said output of said comparator to provide said inphase digital FSK signals, and
   a low pass filter coupled between the 1 output of said flip flop and said minus input of said comparator.

10. A demodulator according to claim 8, wherein said delay means in an N-stage shift register, where N is an integer greater than one.

11. A demodulator according to claim 7, wherein said delay means in an N-stage shift register, where N is an integer greater than one.

12. A demodulator according to claim 1, wherein said third digital means includes
    a read only memory coupled to said first and second digital means.

13. A demodulator according to claim 1, wherein said fourth digital means includes
    a first digital delay means coupled to said third digital means to delay said inphase code signal,
    a second signal digital delay means coupled to said third digital means to delay said quadrature code signal, and
    a read only memory coupled to said third digital means and said first and second digital delay means to determine whether the value of (B−A) is increasing or decreasing.

14. A demodulator according to claim 13, wherein each of said first and second delay means includes
    an M-stage shift register, where M is an integer greater than one.

15. A demodulator according to claim 1, wherein said fifth digital means includes
    logic gate means coupled to said inphase and said quadrature outputs.

16. A demodulator according to claim 15, wherein said first given code is 0 1, and
    said second given code if 1 0,
    said first and second given codes being detected by said logic gate means.

17. A demodulator according to claim 1, wherein said first given code is 0 1, and
    said second given code is 1 0.

18. A demodulator according to claim 1, wherein said averaging means is a low pass filter.

19. A demodulator according to claim 1, wherein said first digital means includes
- a first analog-to-digital converter coupled to said first source to produce said inphase digital reference signal, and
- a first digital delay means coupled to said first converter to produce said quadrature digital reference signal; and said second digital means includes
- a second analog-to-digital converter coupled to said second source to produce said inphase digital FSK signal, and
- a second digital delay means coupled to second converter to produce said quadrature digital FSK signal.

20. A demodulator according to claim 19, wherein each of said first and second converters is a delta modulator.

21. A demodulator according to claim 20, wherein each of said first and second digital delay means is an N-stage shift register, where N is an integer greater than one.

22. A demodulator according to claim 19, wherein each of said first and second digital means is an N-stage shift register, where N is an integer greater than one.

23. A demodulator according to claim 19, wherein said third digital means includes
- a first read only memory coupled to said first and second converters and said first and second digital delay means.

24. A demodulator according to claim 23, wherein each of said first and second converters is a delta modulator.

25. A demodulator according to claim 24, wherein each of said first and second digital delay means is an N-stage shift register, where N is an integer greater than one.

26. A demodulator according to claim 23, wherein each of said first and second digital delay means is an N-stage shift register, where N is an integer greater than one.

27. A demodulator according to claim 23, wherein said fourth digital means includes
- a third digital delay means coupled to said first read only memory to delay said inphase code signal,
- a fourth digital delay means coupled to said first read only memory to delay said quadrature code signal, and
- a second read only memory coupled to said first read only memory and said third and fourth digital delay means to determine whether the value of (B−A) is increasing or decreasing, said second read only memory having said inphase output and said quadrature output.

28. A demodulator according to claim 27, wherein each of said third and fourth digital delay means is an M-stage shift register, where M is an integer greater than one.

29. A demodulator according to claim 28, wherein each of said first and second converters is a delta modulator.

30. A demodulator according to claim 29, wherein each of said first and second digital delay means is an N-stage shift register, where N is an integer greater than one.

31. A demodulator according to claim 27, wherein each of said first and second converters is a delta modulator.

32. A demodulator according to claim 31, wherein each of said first and second digital delay means is an N-stage shift register, where N is an integer greater than one.

33. A demodulator according to claim 27, wherein each of said first and second digital delay means is an N-stage shift register, where N is an integer greater than one.

34. A demodulator according to claim 27, wherein said fifth digital means includes
- logic gate means coupled to said inphase and quadrature outputs of said second read only memory to detect said first and second given codes.

35. A demodulator according to claim 34, wherein each of said third and fourth digital delay means is an M-stage shift register, where M is an integer greater than one.

36. A demodulator according to claim 35, wherein each of said first and second converters is a delta moduator.

37. A demodulator according to claim 36, wherein each of said first and second digital delay means is an N-stage shift register, where N is an integer greater than one.

38. A demodulator according to claim 34, wherein each of said first and second converters is a delta modulator.

39. A demodulator according to claim 38, wherein each of said first and second digital delay means is an N-stage shift register, where N is an integer greater than one.

40. A demodulator according to claim 34, wherein each of said first and second digital delay means is an N-state shift register, where N is an integer greater than one.

41. A demodulator according to claim 34, wherein said averaging means is a low pass filter coupled to said logic gate means.

42. A demodulator according to claim 41, wherein each of said third and fourth digital means is an M-stage shift register, where M is an integer greater than one.

43. A demodulator according to claim 42, wherein each of said first and second converters is a delta modulator.

44. A demodulator according to claim 43, wherein each of said first and second digital delay means is an N-stage shift register, where N is an integer greater than one.

45. A demodulator according to claim 41, wherein each of said first and second converters is a delta modulator.

46. A demodulator according to claim 45, wherein each of said first and second digital delay means is an N-stage shift register, where N is an integer greater than one.

47. A demodulator according to claim 41, wherein each of said first and second digital delay means is an N-stage shift register, where N is an integer greater than one.

48. A demodulator according to claim 41, further including
- a third source of a processing rate clock coupled to said first and second converters and said first, second, third and fourth digital delay means for controlling the operation thereof.

49. A demodulator according to claim 1, further including
- a third source of a processing rate clock coupled to said first, second and fourth digital means for controlling the operation thereof.

* * * * *